United States Patent [19]
Jones et al.

[11] Patent Number: 4,962,635
[45] Date of Patent: Oct. 16, 1990

[54] APPARATUS FOR TRIMMING LAWNS AND THE LIKE

[75] Inventors: Dallas W. Jones, New Hartford; Lauren J. Young, Poland; Richard P. Nadeau, Frankfort, all of N.Y.

[73] Assignee: Trim-A-Lawn Corporation, Mandeville, N.Y.

[21] Appl. No.: 422,768

[22] Filed: Oct. 17, 1989

Related U.S. Application Data

[62] Division of Ser. No. 188,508, Apr. 29, 1988, Pat. No. 4,894,980.

[51] Int. Cl.$^5$ ...................... A01D 34/67; A01D 34/84
[52] U.S. Cl. ................. 56/12.700; 56/17.400; 56/320.200; 56/DIG. 20
[58] Field of Search ............ 56/12.7, 16.7, 17.1, 56/17.2, 17.4, 17.5, 249, 255, 294, 295, 320.1, 320.2, DIG. 17, DIG. 20; 30/276, 347

[56] References Cited

U.S. PATENT DOCUMENTS 4,112,653  9/1978  Ballas et al. ........................ 56/12.7
4,351,143  9/1982  Lessig, III ........................... 56/17.5

*Primary Examiner*—Britts Ramon S.
*Assistant Examiner*—Terry Lee Melius
*Attorney, Agent, or Firm*—Shlesinger & Myers

[57] ABSTRACT

A power trimmer including a handle, a housing, a gas operated engine, a plurality of wheels, and a cutting blade. The housing includes a front wheel mounting member, a rear wheel mounting member, and a cutting blade mounting member. The cutting blade mounting member is offset from the front and rear wheel mounting members. A passageway extends along the upper surface of the cutting blade mounting member. The first end of the passageway is positioned adjacent the exhaust port of the gas operated engine. The second end abuts the rear wheel mounting member. The passageway directs the exhaust fumes from the gas operated engine underneath the housing thereby significantly reducing the noise of the invention. Further, harmful exhaust fumes are directed away from the operator. The cutting blade mounting member includes fixed and removable sections. The removable section can be secured to either side of the fixed section. Thus, an operator can trim from both sides of the power trimmer.

8 Claims, 2 Drawing Sheets

APPARATUS FOR TRIMMING LAWNS AND THE LIKE

This is a division of application Ser. No. 188,508, filed Apr. 29, 1988 now U.S. Pat. No. 4,894,980.

RELATED APPLICATIONS

The assignee of the present invention is the owner of a copending design application on the housing of the present invention. The Serial No. of the design patent application is not know at the present time. The assignee of the present invention is also the owner of a copending utility application Ser. No. 07/080,269, now abandoned. Additionally, the assignee of the present invention is the owner of a copending utility application on a cutting blade for lawnmowers and the like.

FIELD OF THE INVENTION

The present invention pertains to an apparatus for trimming grass from around obstacles such as trees, fences, light posts and the like.

BACKGROUND OF THE INVENTION

Prior devices for trimming grass have been either manually powered or self-propelled. A number of self-propelled/power trimmers use flexible line as the cutting element. Thus, the trimmers are able to cut grass from around trees and various other obstacles without in any way damaging the blade. Further, the operator is not exposed to the hazards of metallic blades. These trimmers, however, require the operator to support the device. The operator becomes tired of supporting the device after only a short period of time thus requiring him/her to take frequent breaks. This will inevitably prolong the laborious chore of cutting the grass. Further, this disadvantage prevents some individuals from using power trimmers altogether because they are simply not strong enough to operate them.

Also, the presently known power trimmers are extremely noisy. The noise of power trimmers is disturbing to the operator as well as any individuals in the immediate vicinity.

OBJECTS AND SUMMARY OF THE INVENTION

An object of the present invention is to provide an improved power trimmer.

Another object of the present invention is to provide a self-supported power trimmer.

A further object of the present invention is to provide a power trimmer with a flexible cutting blade for preventing injury to the operator.

Another object of the present invention is to provide a power trimmer that can cut grass from around obstacles such as lamp posts, fences, buildings etc.

Yet another object of the present invention is to provide a passageway for directing the exhaust of the engine through the housing for significantly reducing the overall noise of the trimmer and for directing unhealthly exhaust fumes away from the operator.

Another object of the present invention is to provide a dropped housing deck for preventing foreign obstacles such as grass and the like from clogging the exhaust passageway.

Yet another object of the invention is to provide a power trimmer with a dropped housing deck for permitting the power trimmer to trim grass under low hanging portions of shrubs, bushes and the like.

A further object of the present invention is to provide a housing that will permit an operator to trim from either side of the power trimmer.

Another object of the present invention is to provide a power trimmer with a dropped housing deck for permitting the power trimmer to mulch the cut grass.

In summary, the present invention discloses a gas powered wheeled trimmer having a cutting blade formed from flexible cutting filaments. A passageway directs the exhaust of the gas engine through the housing thereby significantly reducing the noise of the trimmer.

DETAILED DESCRIPTION OF THE INVENTION

Figure 6:
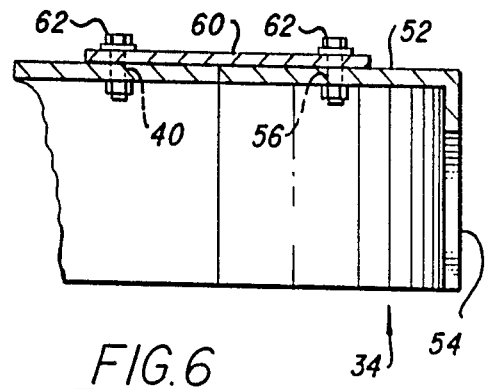
FIG. 6 is a fragmentary cross-sectional view taken along lines 6—6 in FIG. 1.
Figure 1:
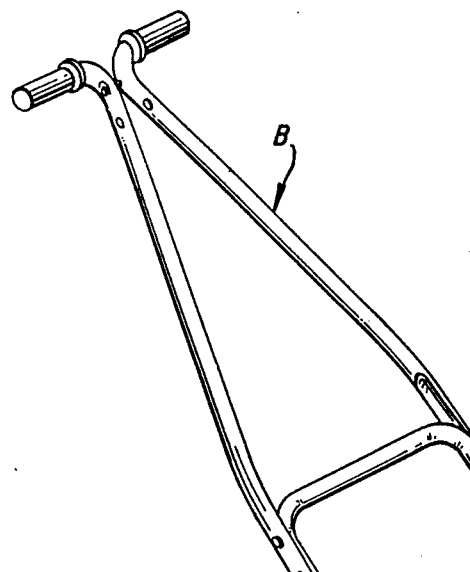
FIG. 1 is a perspective view of the power trimmer formed in accordance with the present invention.
Figure 2:
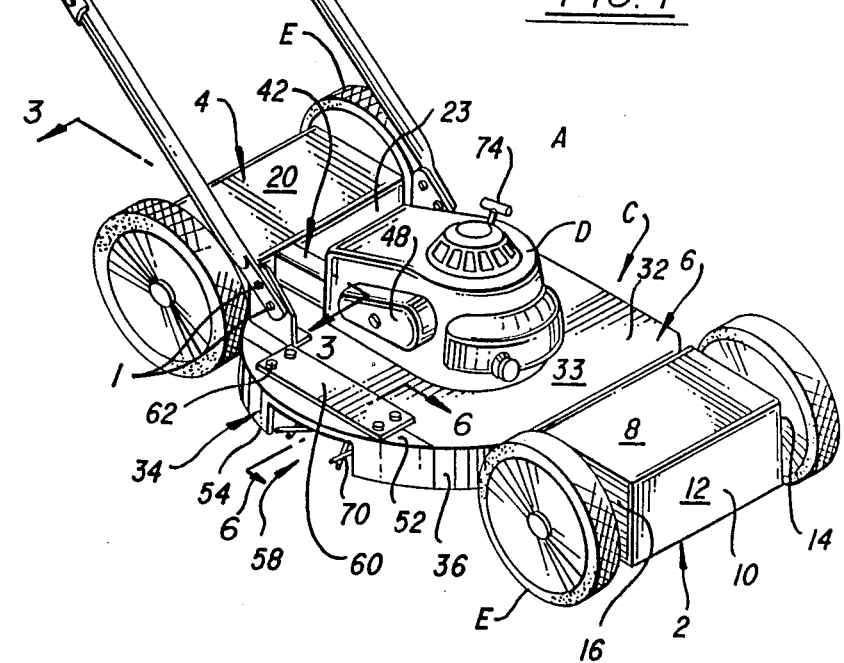
FIG. 2 is a fragmentary side view of the power trimmer of the present invention.
Figure 2:
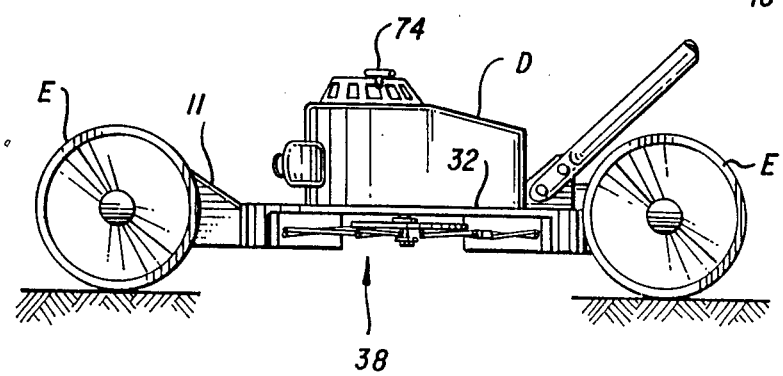

Referring to FIG. 1, the power trimmer A formed in accordance with the present invention will now be described. The power trimmer A includes a handle B, a housing C, a gas powered engine D, four wheels E and a cutting blade F, best seen in FIG. 5. The handle B can be of any conventional type and is secured to housing C via fasteners 1. The housing C includes front wheel mounting member 2, rear wheel mounting member 4 and cutting blade mounting member 6. The front wheel mounting member 2 includes an upper surface 8 a skirt 10 and an inner panel 11. The skirt 10 extends along the other periphery of upper surface 8. The skirt includes outer, left and right sections 12, 14 and 16 respectively. Sections 12, 14 and 16 extend perpendicular to upper surface 8. Inner panel 11 extends from the inner edge of upper surface 8 and forms an obtuse angle therewith. The rear wheel mounting member 4 includes an upper surface 20 a skirt 22 and an inner panel 23. Skirt 22 extends along the outer periphery of upper surface 20. Skirt 22 includes an outer, left and right sections 24, 26 and 28 respectively. Sections 24, 26 and 28 extend perpendicular to upper surface 20. Inner panel 23 extends from the inner edge of upper surface 20 and forms a right angle therewith.

Figure 3:
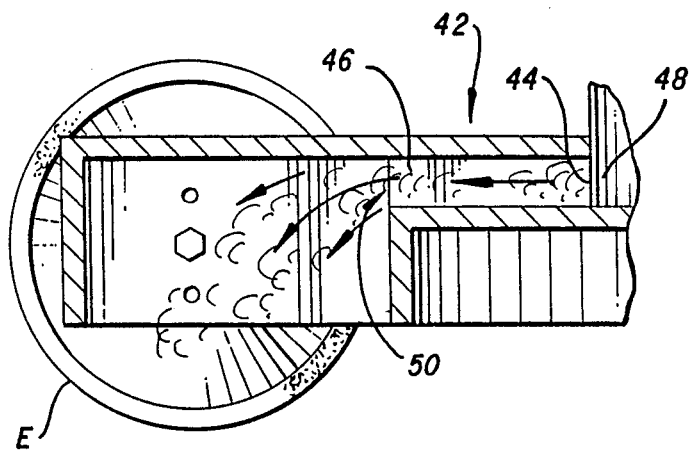
FIG. 3 is a fragmentary cross-sectional view taken along lines 3—3 in FIG. 1.

Cutting blade mounting member 6 includes first and second sections 32 and 34 respectively. First section 32 includes upper surface 33 and skirt 36. Skirt 36 extends along only a portion of the outer periphery of upper surface 33. Openings 38 are formed in skirt 36 on the left and right sides of section 32 (only the opening on the left side is shown). The left and right sides of upper surface 33 extend substantially parallel to each other. First section 32 is fixed to front and rear wheel mounting members 2 and 4. First section 32 includes a pair of holes 40 formed adjacent each side thereof, best seen in FIG. 5. Upper surface 33 of first section 32 is offset from upper surfaces 8 and 20 of front and rear wheel mounting members 2 and 4. Upper surface 33 of first section 32 extends parallel to upper surfaces 8 and 20 of front and rear wheel mounting members 2 and 4. A passageway 42 is formed on upper surface 33 of first section 32. Passageway 42 includes first and second ends 44 and 46. Openings are formed in ends 44 and 46. End 46 is positioned adjacent exhaust port 48 of engine D such that the opening at end 44 surrounds the exhaust port 48. End 46 abuts inner panel 23 of rear wheel mounting member 4. An opening 50, best seen in FIG. 3, is formed in inner panel 23 at the point where passageway 44 abuts inner panel 23. Passageway 42 extends parallel to left and right sides of first section 32 of cutting blade mounting member 6.

Second section 34 includes an upper surface 52 and a skirt 54. Upper surface 52 of second section 34 is aligned with upper surface 33 of first section 32. Upper surface 52 includes a pair of holes 56 formed therein, best seen in FIG. 5. Skirt 54 extends along only a portion of the outer periphery of upper surface 52. An opening 58 is formed in skirt 54. A Plate 60 removably secures second section 34 to first section 32 via screw type fasteners 62. First section 32 is symmetrical about its center line longitudinal axis G thus permitting second section 34 to be secured to either side of first section 32.

Figure 4:
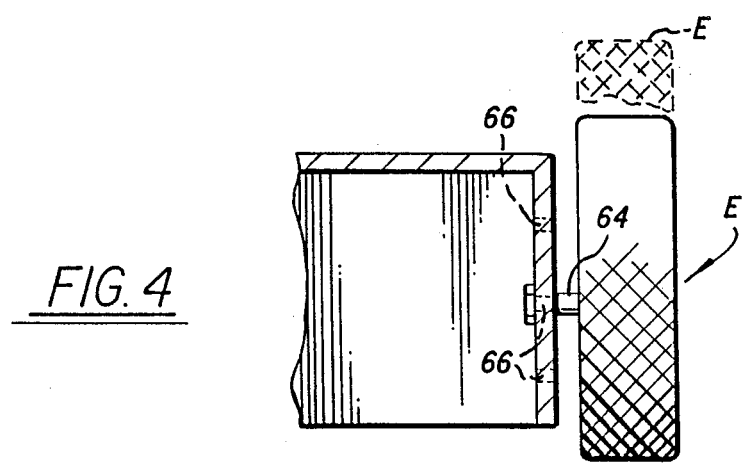
FIG. 4 is a fragmentary cross-sectional view of the power trimmer of the present invention illustrating the adjustable wheel feature.

Referring to FIG. 4, wheels E are adjustably secured to front and rear wheels mounting members 2 and 4 by axles 64. Three spaced holes 66 are formed in sections 14, 16, 26 and 28 thus permitting the operator to vary the height of blade F. It will be appreciated that the height adjustment of wheels E can be achieved by any conventional device. The left and right side of first section 32 are offset inwardly from the outer most point of wheels E. This feature permits an operator to run the wheels of the power trimmer directly up against buildings and similar objects.

Figure 5:
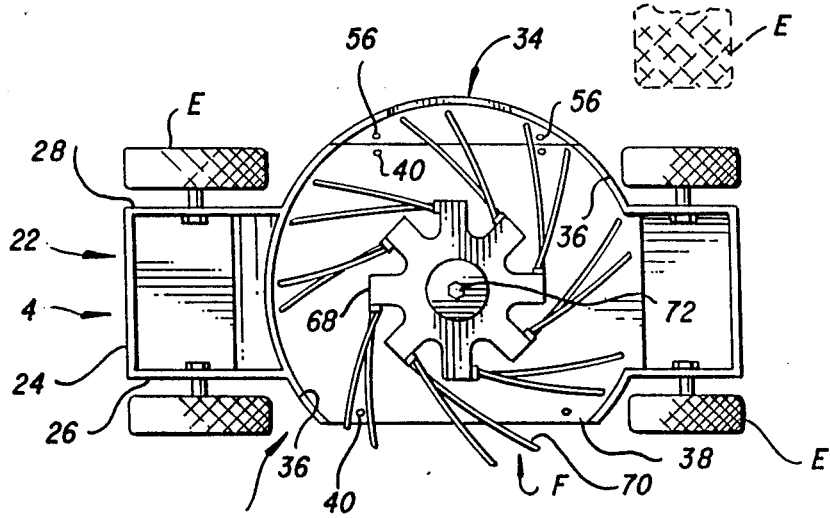
FIG. 5 is a bottom plan view of the power trimmer of the present invention.

Referring to FIG. 5, the cutting blade F includes a rotary member 68 and a plurality of flexible cutting filaments 70 extending therefrom. As seen in FIG. 5, the cutting filaments 70 extend beyond the outer periphery of one side of the cutting blade mounting member 6. Of course, this is the side that does not have the removable section 34 attached thereto. The flexible cutting filaments 70 extend beyond the outer most point of wheels E and thus permit the operator to trim grass from around obstacles such as lamp posts, trees, fence posts, etc. The cutting blade F is mounted on drive shaft 72 by conventional fasteners. The length of housing C about its longitudinal axis is substantially greater than the width of front and rear wheel mounting members 2 and 4. In the preferred embodiment, the length of housing C is 21 inches and the width of front and rear mounting members is 5 inches long. It will be readily appreciated that these dimensions may be varied.

OPERATION

Referring to FIGS. 1 through 5, the operation of power trimmer A will now be described. Engine D is of a conventional rope pull gas powered type engine. Thus, to start the power trimmer the operator need merely pull cord 74. If the operator desires to trim grass from around obstacles on his left side, he need merely run the left side of power trimmer A up against the obstacle. The flexible cutting filaments 70 will cut the grass from around and under a fence, a shrub and various other obstacles without damaging the obstacles or the cutting filament. Grass is ejected from cutting blade mounting member 6 through opening 58 formed in section 34. If the operator finds it necessary to cut grass from around obstacles on his right side, he need merely remove section 34 and secure it to the left side of upper surface 34 and then commence cutting aroud the obstacle. In this manner, the operator can readily trim grass from around obstacles on his left and right sides without turning the power trimmer.

The offset deck formed by upper surfaces 32 and 34 serves several functions. As seen in FIG. 3, it prevents grass from clogging passageway 42. Additionally, the exhaust travels in a straight line for the exhaust port through passageway 42 to the underside of housing C, as best seen in FIG. 3. Thus, the exhaust will meet the least resistance as it travels through passageway 42. Further, this arrangement of the deck minimizes the length of passageway 42 and thus reduces the overall cost of the power trimmer.

An operator can readily adjust the height of cutting blade F by positioning axle 64 in the various holes 66 formed in sections 16, 18, 26 and 28. This feature enables the operator to position the cutting blade F at the desired height.

While this invention has been described as having a preferred design, it is understood that is capable of further modifications, uses and/or adaptations of the invention following in general the principles of the invention and including such departures from the present disclosure as come within the known customary practice in the art to which the invention pertains, and as may be applied to the central features herein before set forth, and fall within the scope of the invention and of the limits of the appended claims.

What is claimed is:

1. An apparatus for trimming lawns and the like, comprising:
   (a) a housing deck;
   (b) a cutting blade means;
   (c) at least a first front wheel and a first rear wheel;
   (d) said housing deck including a cutting blade mount means for receiving said cutting blade means;
   (e) said cutting blade mount means including first and second sections; and means for removably securing said second section to said first section;
   (f) said first section of said cutting blade mount means including left and right sides having substantially straight edge portions;
   (g) said left side edge portion extending substantially parallel to said right side edge portion;
   (h) said cutting blade means including at least a first flexible filament;
   (i) said housing deck further including front wheel mount means for rotatably supporting said at least a first front wheel;
   (j) said housing deck further including rear wheel mount means for rotatably supporting said at least a first rear wheel;
   (k) the length of said housing deck along its longitudinal axis is substantially greater than the width of at least one of said front and rear wheel mount means.

2. An apparatus as in claim 1, wherein:
   (a) said second section is substantially arcuate in shape.

3. An apparatus as in claim 1, further including;
   (a) left and right front wheels, said front wheel mount means including means for rotatably supporting said left and right front wheels;

(b) left and right rear wheels, said rear wheel mount means including means for rotatably supporting said left and right rear wheels;
(c) each of said left and right front and rear wheels include inner and outer surfaces; and (d) said left side edge portion of said first section does not extend beyond said outer surfaces of said left front and left rear wheels.

4. An apparatus as in claim 3, wherein:
(a) said right side portion of said first section does not extend beyond said outer surfaces of said right front and right rear wheels.

5. An apparatus as in claim 1, wherein:
(a) said first section includes means adjacent each of said left and right side edges for removably securing said second section thereto.

6. An apparatus as in claim 5, wherein:
(a) said first section includes a longitudinal axis; and
(b) said first section is substantially symmetrical about said longitudinal axis.

7. An apparatus as in claim 3, wherein:
(a) said cutting blade mount means having a width greater than at least one of said front and rear wheel mount means.

8. An apparatus as in claim 3, wherein:
(a) said cutting blade mount means includes an upper surface and a skirt;
(b) said skirt having first and second openings;
(c) said first opening is positioned adjacent said left front and left rear wheels; and
(d) said second opening is positioned adjacent said right front and right rear wheels.

* * * * *